United States Patent
Gubler et al.

[15] 3,699,225
[45] Oct. 17, 1972

[54] CONTROL OF INSECTS AND ACARINAL WITH CERTAIN PYRIDYL-THIAZALINO PHOSPHATES AND THE CORRESPONDING PHOSPHOROTHIOATES

[72] Inventors: Kurt Gubler; Urs Meyer, both of Riehen; Hans Ulrich Brechbühler, Basel, all of Switzerland

[73] Assignee: Geigy Chemical Corporation, Ardsley, N.Y.

[22] Filed: June 23, 1970

[21] Appl. No.: 53,356

Related U.S. Application Data

[62] Division of Ser. No. 762,643, Sept. 25, 1968, Pat. No. 3,535,325.

[30] Foreign Application Priority Data

Sept. 29, 1967  Switzerland..............13636/67

[52] U.S. Cl.................................................424/200
[51] Int. Cl.................................................A01n 9/36
[58] Field of Search.......................................424/200

[56] References Cited

UNITED STATES PATENTS 3,244,586   4/1966   Rigterink............260/294.8 X

*Primary Examiner*—Albert T. Meyers
*Assistant Examiner*—Doris J. Funderburk
*Attorney*—Karl F. Jorda and Frederick H. Rabin

[57] ABSTRACT

Pyridyl-(2)-phosphates and phosphorothioates are disclosed which have in 5-position at the pyridine nucleus a thiazolinyl-(2) grouping and which are insecticidal and acaricidal agents useful in the control of insects and acarinae, and more particularly of cattle ticks. Compositions containing these novel compounds, methods for controlling insects and acarinae therewith, and novel 2-hydroxy- and 2-mercapto-5-thiazolinyl-(2')-pyridines useful as intermediates in their production are also described.

4 Claims, No Drawings

CONTROL OF INSECTS AND ACARINAL WITH CERTAIN PYRIDYL-THIAZALINO PHOSPHATES AND THE CORRESPONDING PHOSPHOROTHIOATES

This application is a division of our copending application, Ser. No. 762,643, filed Sept. 25, 1968, now U.S. Pat. No. 3,535,325 issued Jan. 8, 1971.

This invention relates to certain novel phosphoric esters and concerns more particularly novel thiazolinlypyridyl phosphates and phosphorothioates, processes for their production and novel intermediate 2-hydroxy- and 2-mercapto-5-thiazolinyl-pyridines from which the said esters can be produced. The invention concerns further insecticidal and acarlcidal compositions containing the aforesaid novel esters as active ingredients as well as processes for the controlling of insects and acarinae with the aid of the aforesaid novel esters and compositions.

The new thiazolinyl-pyridyl phosphates and phosphorothioates which fall under the general formula I

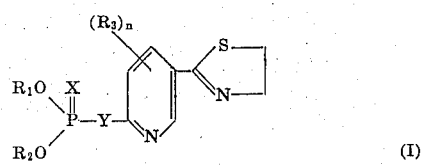

wherein
$R_1$ and $R_2$ independently of each other each represent a lower alkyl or a lower alkenyl radical, or a lower alkyl radical substituted by halogen of an atomic number of at most 35 and/or lower alkoxy,
$R_3$ represents hydrogen, halogen of an atomic number of at most 35 or a lower alkyl radical,
X and Y independently of each other represent oxygen or sulphur, and
n represents 1 or 2,
and their addition salts with inorganic acids, organic sulphonic and organic sulphuric acids, are good to very good contact and stomach poisons for insects and spiders, and have more particularly an excellent long lasting action against insects of the families Muscidae, Stomoxidae and Culicidae, e.g. against a polyvalent resistent and normally sensitive house flies (*Musca demestica*), stable flies (*Stomoxys culcitrons*) and mosquitoes (e.g. *Aedes aegyptil, Culex fatigana, Anopheles stephensi*), against insects of the families Curculionidae, Bruchididae, Dermestidae, Tenebrionidae and Chrysomelidae, e.g. granary weevils (*Sitophilus granarius*), bean beetles (*Bruchidius obtectus*), larder beetles (*Dermestes valpinus*), yellow meal worms (*Tenebrio molitor*), Colorado potato beetles (*Leptinotarsa docomlineata*) and their larval stages, against insects of the family Pyralididae, e.g. Mediterranean flour moths (*Ephestia kühniella*), of the family Blattidae, e.g. cockroaches (*Phyllodromia germanica, Periplaneta americana, Blatta oricatalis*) against insects of the Aphididae family, e.g. leaf uphida (*Aphis fabae*), of the Pseudococcidae family, e.g. citrus mealy bugs (*Planococcus citri*) and of the Locustidae family, e.g. desert locusts (*Locusta migratoria*). Tests on the leaf aphids and locusts indicate also a systemic action.

Moreover, the compounds of formula I have a good action against the larval and adult stages of acarinae, especially ticks, e.g. of the families Ixodidae and Argasidae.

The range of action of the active substances mentioned is broadened and, in particular, the insecticidal and acaricidal action is improved in admixture with synergists which enhance the aforesaid action without being necessarily themselves insecticides or acaricides such as succinic acid dibutyl ester or piperonyl butoxide or with similarly acting auxiliaries such as olive oil or peanut oil. Also, the insecticidal action can be substantially broadened and adapted to given circumstances by the addition of other insecticides such as phosphoric acid esters, phosphonic acid esters, thiophosphoric acid esters and dithiophosphoric acid esters and the amides of these acids, carbamic acid esters, halogenated hydrocarbons such as dichlorodiphenyl-trichloroethane and analogs thereof, pyrethrins and their synergists.

In the general formula I by lower alkyl radicals $R_1$, $R_2$ and $R_3$, those having one to four carbon atoms such as the methyl, ethyl, a propyl or butyl radical, are to be understood, $R_3$ being preferably methyl. $R_1$ and $R_2$, as lower alkenyl radicals, can be, e.g. the allyl, methallyl, or a propenyl radical. By a halogeno-alkyl radical, also radicals having one to four carbon atoms are to be understood, which radicals are mono- or poly-substituted by chlorine and/or bromine; preferred is the β-chloroethyl radical. An alkoxy radical as substituent of a lower alkyl radical $R_1$ and $R_2$ is also one having one to four carbon atoms, preferably the methoxy radical.

In most preferred compounds of formula I $R_3$ represents hydrogen.

The thiazolinyl-pyridyl radical in the compounds of this invention is always a (2'-thiazolinyl)-pyridyl-(2) radical of the formula

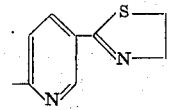

In a first process the new esters of general formula I are produced by reacting a thiazolinyl-pyridine derivative of the general formula II

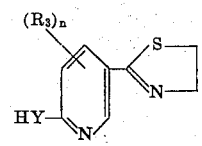

in the presence of a base with a phosphorochloridate or phosphorochloridothioate of the general formula III

or by reacting a salt (oxide or mercaptide) of such a thiazolinly pyridine derivative with such a halide of the general formula III, whereby the symbols $R_1$, $R_2$, $R_3$, X, Y and n in formulas II and III have the meanings given in formula I, and Hal represents chlorine or bromine.

In a second process, the new thiazolinyl-pyridyl phosphates and phosphorothioates of the general formula I can also be produced by conversion of a cyanopyridine derivative of the general formula IV

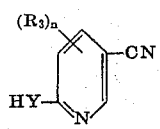

wherein $R_3$, Y and n are defined as in formula I, or a salt of this cyanopyridine derivative with a base, with a phosphoro-chloridate of the general formula III

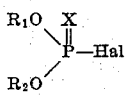

into a 5-cyanopyridine phosphate or phosphorothioate of the general formula V

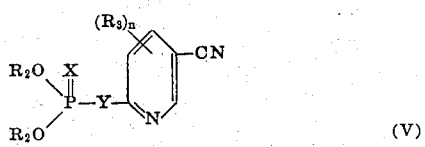

as described in U.S. Pat. No. 3,326,752 to R.H. Rigterink, and reaction of the latter with cysteamine ($HS-CH_2-CH_2-NH_2$) to form the corresponding phosphoric ester of formula I, whereby the symbols $R_1$, $R_2$, $R_3$, X, Y, n, and Hal have the meanings given above in formulas I and III.

The cysteamine necessary for this purpose can also be formed in situ from ethyleneimine and hydrogen sulphide.

Because of the sensitivity of cysteamine to air, in this process it is advantageous to perform the reaction with the intermediate product of formula V in an inert gas atmosphere, e.g. under an atmosphere of nitrogen. Also, decomposition of the cysteamine can be minimized or prevented if, in the form of addition salt, e.g. hydrochloride or hydrobromide, it is dissolved in an anhydrous solvent and then gradually converted into the free base by the addition of a stronger base such as gaseous ammonia, and it is reacted in this solution with the intermediate product of formula V.

The two above described processes are preferably performed in the presence of solvents or diluents which are inert to the reaction partners, e.g. in the presence of ketones such as acetone, methylethyl ketone, ethers and other-type compounds, alcohols, amides, hydrocarbons and halogenated hydrocarbons. If the reaction of the thiazolinyl-pyridine derivative of formula II, or of the cyanopyridine derivative of formula IV, respectively, with a phosphorochloridate of formula III is performed in the presence of a base, then both inorganic bases such as hydroxides or carbonates of alkali or alkaline earth metals or of ammonium as well as organic bases such as tertiary amines, are used. If a salt (oxide or mercaptide) of the thiazolinyl pyridine is used for the reaction, then chiefly the alkali and alkaline earth metal salts, the ammonium salt and the salts with strong organic bases are mentioned as such.

The new phosphoric esters of formula I are stable substances, some of which are crystalline. They dissolve well in organic solvents. They form addition salts with inorganic acids, e.g., with nalohydric acids such as hydrochloric acid, phosphoric acids, nitric acid, sulphuric acid, perchloric acid or with alkane sulphonic acids such as methanesulphonic acid and ethanesulphonic acid, or with alkylsulphuric acids such as methylsulphuric acid and ethylsulphuric acid.

The 2-hydroxy- and 2-mercapto-5-thiazolinyl-(2')-pyridine derivatives of general formula II which are used as starting materials, are new compounds. They can be prepared by various methods.

In a preferred method (a), the new 2-hydroxy- and 2-mercapto-5-thiazolinyl-(2')-pyridine derivatives of the general formula II are produced by reaction of a cyanopyridine derivative of the general formula IV

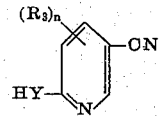

wherein $R_3$, Y and n are defined as in formula I, with cysteamine $HS-CH_2-CH_2-NH_2$.

Instead of reacting a cyanopyridine derivative of formula IV direct with cysteamine, the former can first be converted with aliphatic alcohols into the corresponding imino ethers in which the cyano group in formula IV is replaced by a group

wherein $R_4$ is the radical of the aliphatic alcohol, and the imino ethers obtained can be reacted with cysteamine to form derivatives of formula II.

The cysteamine required for this process and the variation thereof can also be formed in situ from ethyleneimine and hydrogen sulphide.

Because of the sensitivity of cysteamine to air, it is advantageous to perform the reactions with cysteamine in an inert gas atmosphere, e.g. under an atmosphere of nitrogen, or to prevent the decomposition of the cysteamine by dissolving it in the form of a salt, e.g. as hydrochloride, and liberating it in the reaction mixture by the continuous addition of a stronger base, e.g. by the gradual introduction of ammonia.

According to another method (b), the thiazolinyl pyridins of formula II can be obtained by converting a cyanopyridine of formula IV with hydrogen sulphide into a corresponding thioamide in which the cyano group of the cyanopyridine is replaced by the group

and reacting this thioamide with a β-halogen ethylamine or with a salt of the latter to form thiazolinyl pyridines of formula II.

In a method (c), the thiazolinyl pyridines of formula II can also be produced by reacting the β-hydroxyethylamide or a β-halogen ethylamide of a substituted pyridine carboxylic acid of the general formula VI

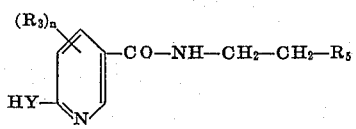

wherein

R$_5$ represents a hydroxyl group or a halogen atom, and

R$_3$, Y and n are defined as in formula I, with phosphorus pentasulphide.

The methods (a), (b) and (c) described above for the production of the novel thiazolinyl pyridines of formula II are preferably performed in the presence of solvents or diluents which are inert to the reaction components, e.g. in the presence of ketones such as acetone, methylethyl ketone, ethers, alcohols, amides, hydrocarbons and halogenated hydrocarbons etc.

The thiazolinyl-pyridines of the general formula II are stable substances which crystallize well and are soluble in organic solvents.

The following non-limitative examples illustrate the invention further. The temperatures are given therein in degrees Centigrade.

EXAMPLE 1 a. Gaseous ammonia is introduced for 1.5 hours into a solution of 192 g. of 2-hydroxy-5-cyano-pyridine and 233 g of cysteamine hydrochloride in 1.5 liters of abs. ethanol at 10° – 15°. The reaction mixture is then refluxed for 10 hours under an atmosphere of nitrogen, after which it is filtered hot. The filtrate is cooled to 0° – 5° and the precipitate is filtered off. After recrystallization from methanol, 2-hydroxy-5-thiazolinyl-(2')-pyridine melts at 187° – 190°.

b. 20 g. of 2-hydroxy-5-thiazolinyl-(2')-pyridine are suspended in 120 ml. of methylethyl ketone and the suspension is then heated for 1 hour at 60° while stirring. 16.9 g. of dry potash are then added to this suspension and, after heating for 1 hour at 60°, 23.5 g of O,O-diethyl phosphorochloridothioate are added dropwise at 70°. The reaction mixture is then heated for 5 hours at 75° and left to stand. The salt which precipitates is isolated and thoroughly washed with ether. The methylethyl ketone filtrate and the ether extracts are combined, shaken with 20 ml. of 2N aqueous sodium hydroxide solution and then washed until the washing liquid is neutral. After drying, the mixture of solvents is distilled off and the residue is recrystallized from ether/petroleum ether. The 0-[5-(2'-thiazolinyl)-pyridyl-(2)]-O,O-diethyl phosphorothioate thus obtained melts at 54° – 57°.

EXAMPLE 2 a. A suspension of 9 g. of 2-hydroxy-5-cyanopyridine and 8 g. of dry potash in 100 ml. of methylethyl ketone is stirred at 60° for one hour. Then, 14.2 g. of O,O-diethyl phosphorochloridethioate are added dropwise at the same temperature. The reaction mixture is stirred for 10 hours at 70° –75°, filtered, the precipitate washed with ether, and the filtrate evaporated. The residue is dissolved in ether, the ether solution shaken with 10 ml. of 2N sodium hydroxide, washed with water and dried over sodium sulfate. After evaporating the ether the 0-[5-cyano-pyridyl-(2)]-O,O-diethyl-phosphorothioate is obtained as an oily substance which is sufficiently pure for further use.

b. Gaseous ammonia is introduced for 30 minutes into a suspension of 7.4 g. of cysteamine hydrochloride in 100 ml. of methanol at 10° – 15°. The excess ammonia is then stripped off by sparging nitrogen into the mixture. 11.7 g. of 0-[5-cyanopyridyl-(2)]-O,O-diethyl phosphorothioate are added and the reaction mixture heated to reflux for 5 hours under an atmosphere of nitrogen. The mixture is evaporated to dryness, the residue treated with 50 ml. of water and filtered. The product is recrystallized from methanol, and the 0-[5-(2'-thiazolinyl)-pyridyl-(2)]-O,O-diethyl phosphorothioate thus obtained melts at 57° – 59°.

EXAMPLE 3 a. A sample of the phosphorus compound prepared in Example 2 (b) is dissolved in ether and the calculated amount of concentrated sulfuric is added dropwise in the cold. The precipitate is filtered off, washed with ether, and the 0-[5-(2'-thiazolinyl)-pyridyl-(2)]-O,O-diethyl phosphorothioate hydrosulfate is thus obtained; M.P. 92° – 94°.

b. By introducing hydrogen chloride into an ether solution of the phosphorus compound prepared in Example 2 (b) and isolating the precipitate thus formed, the 0-[5-(2'-thiazolinyl)-pyridyl-(2)]-O,O-diethyl phosphorothioate hydrochloride is obtained; M.P. 84° – 87°.

The phosphoric esters of the general formula I listed in the following Table are obtained in the way described in the Examples 1 to 3.

| No. | compounds | physical constants |
|---|---|---|
| 1 | O-]5-(2'-thiazolinyl)-pyridyl-(2)]-O,O-dimethyl phosporothioate | n$_D^{22}$ 1.5902 |
| 2 | O-[5-(2'-thiazolinyl)-pyridyl-(2)]-O,O-di-n-propyl phosphorothioate | M.P. 20–25° |
| 3 | O-[5-(2'-thiazolinyl)-pridyl-(2)]-O,O-di-n-butyl phosphorothioate | |
| 4 | O-[3-chloro-5-(2'-thiazolinyl)-pyridyl-(2)]-O,O-diethyl phosphorothioate | M.P. 58–60° |
| 5 | O-[3-bromo-5-(2'-thiazolinyl)-pyridyl-(2)]-O,O-diethyl phosphorothioate | M.P. 86–87° |
| 6 | O-[6-methyl-5-(2'-thiazolinyl)-pyridyl-(2)]-O,O-dimethyl phosphorothioate | |
| 7 | O-[6-methyl-5-(2'-thiazolinyl)-pyridyl-(2)]-O,O-diethyl phosphorothioate | |
| 8 | O-[5-(2'-thiazolinyl)-pyridyl-(2)]-O-methyl-O-isopropyl phosphorothioate | |
| 9 | O-[5-(2'-thiazolinyl)-pyridyl-(2)]-O,O-diallyl phosphorothioate | |
| 10 | O-[5-(2'-thiazolinyl)-pyridyl-(2)]-O,O-di-β-chloroethyl phosphorothioate | |
| 11 | O-[5-(2'-thiazolinyl)-pyridyl-(2)]-O,O-dimethoxyethyl phosphorothioate | |
| 12 | O-[5-(2'-thiazolinyl)-pyridyl-(2)]-O,O-dimethyl phosphate | |
| 13 | O-[5-(2'-thiazolinyl)-pyridyl-(2)]-O,O-diethyl phosphate | M.P. 88–90° |
| 14 | O-[5-(2'-thiazolinyl)-pyridyl-(2)]-o,O-di-n-propyl phosphate | |
| 15 | S-[5-(2'-thiazolinyl)-pyridyl-(2)]-O,O-dimethyl phosphorothioate | |
| 16 | S-[5-(2'-thiazolinyl)-pyridyl-(2)]-O,O-diethyl phosphorothioate | |
| 17 | S-[5-(2'-thiazolinyl)-pyridyl-(2)]-O,O-dimethyl phosphorodithioate | |
| 18 | S-[5-(2'-thiazolinyl)-pyridyl-(2)-O,O-diethyl phosphorodithioate | |

Action on larvae of Boophilus microplus (cattle tick)

A number of 100 larvae of Boophilus microplus (age 2 – 4 weeks) of the DELNAV-resistant Ridgeland strain (Table 1) or of the DIAZINON-resistant Las Guerisas strain (Table 2) are placed on a round filter paper of 11 cm. diameter which is then laid in a Petri dish of 15 cm. diameter the bottom of which has been previously covered with 3 ml. of a solution of one of the test substances listed in column 1 of the tables, infra, in acetone/water (volume ratio 1:20) in a concentration of 0.002 percent of test substance calculated on the weight of the solution. Another 4 ml. of this solution are applied on the filter paper bearing the larvae and a second filter paper is laid on top of the larvae. 3 ml. of the solution of test substance are applied on this second filter paper. After 10 minutes, the larvae are placed on a fresh filter paper and kept at room temperature and at 85 percent relative humidity. The number of immobilized larvae is determined after a period of 3, 4, 6, 8, 15 and 24 hours.

TABLE 1

| test substance | concentration of test substance | numbers of larvae in immobilised after | |
|---|---|---|---|
| | | 3 hours | 4 hours |
| O-[5-(2'-thiazolinyl)-pyridyl-(2)]-O,O-diethyl phosphorothioate | 0.002% | 30 | 100 |
| O-[3,5,6-trichlorophyridyl-(2)]-O,O-diethyl phosphorothioate (known from U.S. Patent No. 3,244,586) | 0.002% | 4 | 2d |

TABLE 2

| test substance | concentration of test substance | numbers of larvae in immobilized after | | |
|---|---|---|---|---|
| | | 4 hours | 6 hours | 8 hours |
| O-[5-(2'-thiazolinyl)-pyridyl-(2)]-O,O-diethyl phosborothioate | 0.002% | 41 | 93 | 100 |
| O-[3,5,6-trichloropyridyl-(2)]-O,O-diethyl phosphorothioate (known from U.S. Patent No. 3,244,586) | 0.002% | 26 | 57 | 82 |

Action on oviposition and hatching of female cattle ticks (*Boophilus microplus*)

A number of 10 engorged female ticks of *Boophilus microplus* (cattle tick) of the resistant Biarra strain are dipped for 3 minutes into a solution of one the test substances listed in column 1 of the table, infra. To prepare this solution the calculated amount (calculated on the weight of the solution) of test substance is dissolved in acetone and diluted with water to yield an acetone/water mixture having a volume ratio of about 1:20. The ticks thus treated are lightly dried on filter paper, placed into test tubes and kept at 27° C and 85 percent relative humidity. The activity of a test substance is measured by determining the number of ovipositing ticks and the rate of hatching of larvae from the eggs of the treated ticks. Oviposition is controlled after 5, 10 and 15 days.

| test substance | concentration of test substance | number of ovipositing ticks | hatching rate | activity |
|---|---|---|---|---|
| O-[5-(2'-thiazolinyl)-pyridyl-(2)]-O,O-diethyl phosphorothioate | 0.05% | 4 | 0 | 100% |
| O-[2-isopropyl-4-methyl-pyrimidyl-(6)]-O,O-diethyl phosphorothioate (DIAZENON) (known from British Patent No. 713,278) | 0.05% | 10 | 10 | 0% |

The insecticidal and acaricidal compositions containing the new active substances of general formula I are produced in the known way by thoroughly mixing and milling the active substances of general formula 1 with suitable carriers, optionally with the addition of dispersing agents or solvents which are inert to the active substances. The new active substances can be worked up into the following forms for use:

Solid forms: dusts, sprinkling agents, granulates (coated granules, impregnated granules, homogeneous granules);

Water dispersible concentrates of active substance: wettable powders, pastes, emulsions;

Liquid forms: solutions, aerosols.

The concentration of active substance in these compositions is 0.01 to 80 percent calculated on the weight of the composition. Other biocidal active substances or agents can be admixed with these compositions. Thus, to broaden the range of action, the new compositions can contain, for example, other insecticides and acaricides, also fungicides, bactericides, fungistatics, bacteriostatics or nematocides in addition to the active substances mentioned of general formula I and the salts thereof. The compositions according to the invention can also contain fertilizers, trace elements etc.

The following forms for application of the insecticidal and acaricidal agents further illustrate the invention; where not otherwise expressly stated, "parts" mean parts by weight. All percentages given therein are calculated on the total weight of the respective composition.

DUST

The following components are used to produce (a) a 10 percent and (b) a 2 percent dust:

(a) 10 parts of O-[5-(2'-thiazolinyl)-pyridyl-(2)-O,O-diethyl phosphorothioate,
5 parts of finely dispersed silicic acid having a particle size of about 25 mµ and a density of 2.2 (commercially available under the trademark "Aerosil"),
85 parts of talcum;

(b) 2 parts of O-[5-(2'-thiazolinyl)-pyridyl-(2)]-O,O-dimethyl phosphorothioate,
1 part of finely dispersed silicic acid having a particle size of about 25 mµ and a density of 2.2 (commercially available under the trademark "Aerosil"),
97 parts of talcum;

The active substances are mixed with milled with the carriers. The dusts obtained are suitable, e.g. for controlling cockroaches and ants in houses.

SPRINKLING AGENT

The following components are used to produce a 25 percent sprinkling agent:

25 parts of O-[5-(2'-thiazolinyl)-pyridyl-(2)]—O,O-di-n-propyl phosphorothioate,
0.25 part of a composite emulsifier consisting of the condensation product of octylphenol and ethylene oxide (average molar ratio of 1:10) and calcium dodecylphenyl
sulphonate, in a weight ratio of about 1:1,
50 parts of kieselguhr,
24.75 parts of calcium sulphate dihydrate;

The active substance is intimately mixed and milled with the emulsifier and the kieselguhr and then the calcium sulphate is mixed in. A sprinkling agent which is particularly suitable for floor disinfection is obtained.

WETTABLE POWDERS

The following components are used to produce (a) a 50 percent and (b) a 10 percent wettable powder:

(a) 50 parts of O-[5-(2'-thiazolinyl)-pyridyl-(2)]
—O,O-diethyl phosphorothioate,
5 parts of naphthalene sulphonic acid/phenol sulphonic acid/formaldehyde condensate (average molar ratio 3:2:1),
5 parts of Champagne chalk,
20 parts of kioselguhr,
15 parts of kaolin,
5 parts of sodium oleoyl methyl tauride;
(b) 10 parts of O-[5-(2'-thiazolinyl)-pyridyl-(2)]
—O,O-diethyl phosphate,
3 parts of a mixture of the sodium salts of saturated fatty alcohol sulphates,
5 parts of sodium methylene bis-naphthalene sulphonate,
82 parts of kaolin;

The active substances are intimately mixed with the carriers and dispersing agents in suitable mixers and the mixture is milled in corresponding mills and rollers. Wettable powders are obtained which can be diluted with water to form suspensions of any concentration desired. Such suspensions can be used for controlling insects which cause damage by eating and sucking, as well as for controlling ticks in pets and domestic animals.

EMULSION CONCENTRATE

To produce a 25% emulsion concentrate 25 parts of O-[5-(2'-thiazolinyl)-pyridyl-(2)]
—O,O-diethyl phosphorothioate,
2.5 parts of epichlorohydrin,
5 parts of a composite emulsifier consisting of the condensation product of octylphenol and ethylene oxide (average molar ratio of 1:10) and calcium dodecylphenyl sulphonate, in a weight ratio of about 1:1,
67.5 parts of xylene are mixed together. This concentrate can be diluted with water to form emulsions of concentrations suitable for the protection of plants and stores. In particular, such emulsions are suitable for the controlling of ticks in pets and domestic animals.

We claim:

1. A composition comprising (1) an insecticidal or acaracidal amount of a compound selected from the group consisting of an ester of the formula:

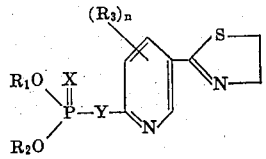

wherein
each of $R_1$ and $R_2$ represents lower alkenyl or lower alkyl optionally substituted by halogen of an atomic number of at most 35 or lower alkoxy,
$R_3$ represents hydrogen, halogen of an atomic number of at most 35 or lower alkyl,
each of X and Y represents oxygen or sulfur, and
$n$ represents 1 to 2,
and an addition salt thereof with an inorganic mineral acid, a lower alkyl sulfonic acid, or a lower alkyl sulfuric acid,
and (2) an adjuvant compatible therewith selected from the group consisting of a carrier, a dispersing agent and a solvent.

2. A composition as defined in claim 1, wherein said ester is O-[5-(thiazolinyl)-pyridyl-(2)]-O,O-diethyl phosphorothioate.

3. A method for controlling insects and spiders, which comprises applying to a habitat of said insects and spiders an insecticidally or acaricidally effective amount of a compound of the formula

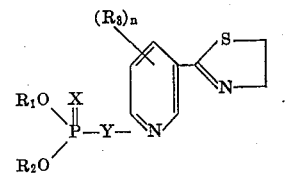

wherein
each of $R_1$ and $R_2$ represents lower alkenyl or lower alkyl optionally substituted by halogen of an atomic number of at most 35 or lower alkoxy,
$R_3$ represents hydrogen, halogen of an atomic number of at most 35 or lower alkyl,
each of X and Y represents oxygen or sulfur, and
$n$ represents 1 or 2,
or an addition salt thereof with an inorganic mineral acid, a lower alkyl sulfonic acid, or a lower alkyl sulfuric acid.

4. The method of claim 3, wherein the compound is O-[5-(thiazolinyl)-pyridyl-(2)]-O,O-diethyl phosphorothioate.

* * * * *